US008046146B2

(12) United States Patent
Osborn et al.

(10) Patent No.: US 8,046,146 B2
(45) Date of Patent: Oct. 25, 2011

(54) ADAPTIVE ABS CONTROL

(75) Inventors: Douglas Charles Osborn, Royal Oak, MI (US); James Andrew Techentin, Hartland, MI (US); Jong Wook Lee, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 11/346,773

(22) Filed: Feb. 3, 2006

(65) Prior Publication Data
US 2007/0185639 A1    Aug. 9, 2007

(51) Int. Cl.
*G08G 1/16* (2006.01)

(52) U.S. Cl. .............. 701/71; 701/70; 701/78; 701/300; 701/301; 701/302; 303/122.01; 303/139; 340/435; 340/436; 342/107

(58) Field of Classification Search ............. 701/22, 701/28, 36, 45, 48, 51, 53, 54, 65, 70, 71, 701/78, 79, 93, 96, 300–302
See application file for complete search history.

(56) References Cited

U.S. PATENT DOCUMENTS

| | | | | |
|---|---|---|---|---|
| 4,833,469 A | | 5/1989 | David | |
| 5,286,099 A | * | 2/1994 | Fujita et al. | 303/125 |
| 5,332,056 A | * | 7/1994 | Niibe et al. | 180/169 |
| 5,357,438 A | * | 10/1994 | Davidian | 701/301 |
| 5,382,086 A | * | 1/1995 | Tuck et al. | 303/156 |
| 5,461,357 A | * | 10/1995 | Yoshioka et al. | 340/435 |
| 5,529,139 A | * | 6/1996 | Kurahashi et al. | 180/169 |
| 5,540,298 A | * | 7/1996 | Yoshioka et al. | 180/169 |
| 5,684,473 A | * | 11/1997 | Hibino et al. | 340/903 |
| 5,803,864 A | * | 9/1998 | Yoo | 477/119 |
| 5,948,035 A | * | 9/1999 | Tomita | 701/70 |
| 5,952,939 A | * | 9/1999 | Nakazawa et al. | 340/903 |
| 5,983,161 A | * | 11/1999 | Lemelson et al. | 701/301 |
| 6,084,508 A | * | 7/2000 | Mai et al. | 340/463 |
| 6,094,616 A | * | 7/2000 | Andreas et al. | 701/96 |
| 6,161,907 A | * | 12/2000 | Luckevich et al. | 303/158 |
| 6,169,478 B1 | * | 1/2001 | Hada et al. | 340/435 |
| 6,175,799 B1 | * | 1/2001 | Tsutsumi et al. | 701/96 |
| 6,223,117 B1 | * | 4/2001 | Labuhn et al. | 701/93 |
| 6,249,738 B1 | * | 6/2001 | Higashimata et al. | 701/96 |
| 6,304,808 B1 | * | 10/2001 | Milot | 701/91 |
| 6,363,326 B1 | * | 3/2002 | Scully | 701/301 |
| 6,430,494 B1 | * | 8/2002 | Inoue et al. | 701/96 |
| 6,437,688 B1 | * | 8/2002 | Kobayashi | 340/435 |
| 6,559,762 B1 | * | 5/2003 | Tarabishy et al. | 340/435 |
| 6,567,748 B2 | * | 5/2003 | Matsuno | 701/301 |
| 6,594,574 B2 | * | 7/2003 | Isogai et al. | 701/96 |
| 6,618,000 B2 | * | 9/2003 | Winner et al. | 342/71 |
| 6,650,983 B1 | * | 11/2003 | Rao et al. | 701/45 |
| 6,659,572 B2 | * | 12/2003 | Bond et al. | 303/193 |
| 6,724,300 B2 | * | 4/2004 | Miyakoshi et al. | 340/435 |
| 6,769,504 B2 | * | 8/2004 | Kobayashi et al. | 180/169 |
| 6,842,684 B1 | * | 1/2005 | Kade et al. | 701/70 |
| 7,018,004 B2 | * | 3/2006 | Chen et al. | 303/193 |

(Continued)

*Primary Examiner* — Jack Keith
*Assistant Examiner* — Jonathan M Dager
(74) *Attorney, Agent, or Firm* — MacMillan, Sobanski & Todd, LLC

(57) ABSTRACT

A method is provided for adaptively determining an anti-lock braking strategy that includes monitoring a distance differential of at least one target in proximity to a driven vehicle. An anti-lock braking strategy is determined as a function of the distance differential. The anti-locking braking strategy is applied as a function of the distance differential.

15 Claims, 3 Drawing Sheets

U.S. PATENT DOCUMENTS

| | | | |
|---|---|---|---|
| 7,089,114 B1 * | 8/2006 | Huang | 701/301 |
| 7,099,764 B2 * | 8/2006 | Seto et al. | 701/70 |
| 7,102,495 B2 * | 9/2006 | Mattes et al. | 340/435 |
| 7,184,889 B2 * | 2/2007 | Isaji et al. | 701/301 |
| 7,278,694 B2 * | 10/2007 | Choi et al. | 303/156 |
| 2002/0091479 A1 * | 7/2002 | Maruko et al. | 701/96 |
| 2003/0014176 A1 * | 1/2003 | Levine | 701/70 |
| 2003/0030552 A1 * | 2/2003 | Tonkin | 340/435 |
| 2003/0191586 A1 * | 10/2003 | Miller et al. | 701/301 |
| 2004/0090117 A1 * | 5/2004 | Dudeck et al. | 303/191 |
| 2004/0155811 A1 * | 8/2004 | Albero et al. | 342/70 |
| 2004/0193351 A1 * | 9/2004 | Takahashi et al. | 701/70 |
| 2004/0193374 A1 * | 9/2004 | Hac et al. | 701/301 |
| 2005/0085984 A1 * | 4/2005 | Uhler et al. | 701/70 |
| 2005/0090981 A1 * | 4/2005 | Gaegauf et al. | 701/301 |
| 2005/0102089 A1 * | 5/2005 | Linden | 701/96 |
| 2005/0133317 A1 * | 6/2005 | Chen et al. | 188/193 |
| 2005/0162012 A1 * | 7/2005 | Sakai et al. | 303/191 |
| 2005/0235820 A1 * | 10/2005 | Fujiwara et al. | 91/369.2 |
| 2005/0267683 A1 * | 12/2005 | Fujiwara et al. | 701/301 |
| 2006/0052927 A1 * | 3/2006 | Watanabe et al. | 701/71 |
| 2006/0106538 A1 * | 5/2006 | Browne et al. | 701/301 |
| 2006/0131951 A1 * | 6/2006 | Nakayama et al. | 303/9.64 |
| 2006/0163943 A1 * | 7/2006 | Von Holt et al. | 303/177 |
| 2006/0250297 A1 * | 11/2006 | Prakah-Asante et al. | 342/70 |
| 2006/0293856 A1 * | 12/2006 | Foessel et al. | 701/301 |
| 2007/0005213 A1 * | 1/2007 | Nou et al. | 701/70 |
| 2007/0132563 A1 * | 6/2007 | Balbale et al. | 340/435 |

* cited by examiner

ADAPTIVE ABS CONTROL

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field of the Invention

This invention relates in general to antilock braking system and in particular continuous and adaptive anti-lock braking systems.

2. Description of the Related Art

Present day vehicle braking systems typically include secondary braking systems such as anti-lock braking (ABS), traction control (TC), and vehicle stability control (VSC) functions. Sensors provide input signals to an electronic control unit (ECU) concerning the vehicles velocity in addition to wheel slip and/or trajectory changes. The ECU provides output command signals to electrically activated devices to apply, hold, and relieve (dump) hydraulic braking to/from the vehicle brakes for applying, maintaining, or relieving pressure at respective brake actuators of each wheel of the vehicle. Such valves are independently actuated to control the vehicle braking at a respective wheel.

During secondary braking operations, the braking control system controls the applied braking force to the vehicle by pulsating (modulating) the braking force applied to each wheel via the electrically activated devices. ABS systems, for example, rapidly apply and release a respective brake actuator to rapidly decelerate the vehicle in an efficient manner. Such braking functionality is well known to those skilled in the art. The objective is to decelerate the vehicle rapidly without locking up each vehicle wheel while maintaining a directional path of travel along the vehicle's intended trajectory path. Typically this is achieved by monitoring vehicle speed and wheel slip at each wheel and applying an ABS braking control strategy. The braking control strategy uses a predetermined ABS control algorithm based on the vehicle speed and wheel speed differentials.

Typically, the braking control strategy will factor in only wheel slip and vehicle speed parameters for rapidly decelerating the vehicle or bringing the vehicle to a stop utilizing ABS control. Factors not taken into consideration are objects within a vehicles intended trajectory or adjacent the vehicle and their respective distances from the driven vehicle. Applying a braking strategy for minimizing the stopping distance in all cases could compromise vehicle stability and lead to a collision with adjacent vehicles. Alternatively applying a braking strategy for maintaining full vehicle stability may not allow the operator to stop the vehicle in the distance available.

BRIEF SUMMARY OF THE INVENTION

The present invention has the advantage of sensing the velocity and distance differential of any target proximate to a driven vehicle for applying an anti-lock braking strategy that continuously adapts to targets proximate to the driven vehicle by optimizing between a required stopping distance and vehicle stability.

In one aspect of the present invention, a method is provided for adaptively determining an anti-lock braking strategy that includes monitoring a distance differential of at least one target in proximity to a driven vehicle. An anti-lock braking strategy is determined as a function of the distance differential. The anti-lock braking strategy is applied as a function of the distance differential.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
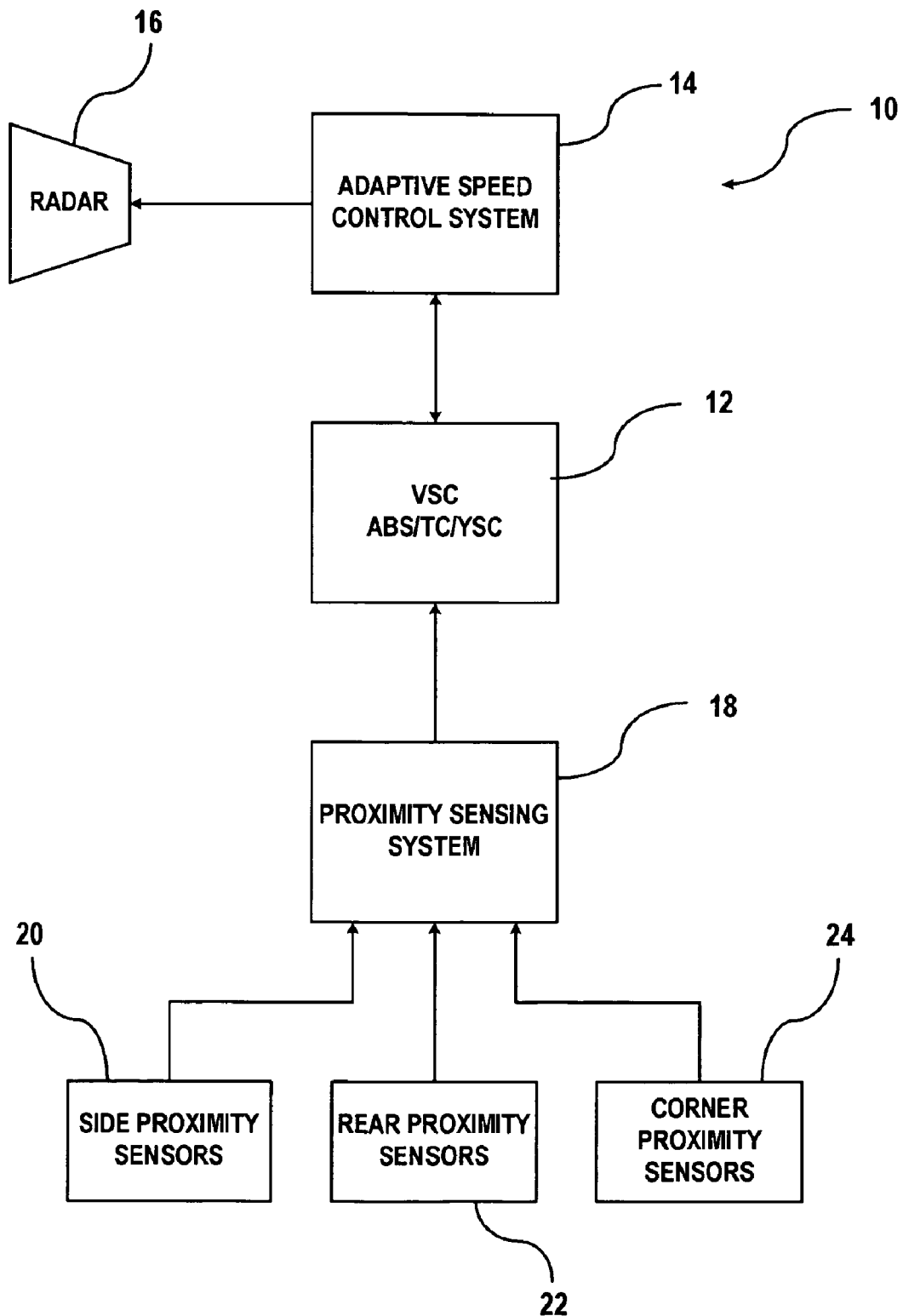
FIG. 1 is a schematic diagram of a continuous adaptive brake control system according to a first preferred embodiment of the present invention.

Referring now to the drawings, there is illustrated in FIG. 1 a block diagram of the continuous adaptive brake control system shown generally at 10. The continuous adaptive brake control system 10 includes a braking control unit 12. The braking control unit 12 provides primary braking functions (i.e., as demanded by a driver) and secondary braking functions (i.e., vehicle stability control functions). Such secondary braking functions are automatically implemented in response to either a driver's brake apply demand or when a vehicle encounters stability control problems. Such secondary braking functions may include vehicle stability control functionality (VSC), antilock braking functionality (ABS), traction control functionality (TC), and yaw stability control functionality (YSC).

The brake control unit 12 is in communication with an adaptive speed control system 14 such an adaptive cruise control system (ACC). The adaptive speed control system 14 is coupled to a radar unit 16 for sensing targets proximate to the vehicle. Target as defined herein refers to a vehicle other than the driven vehicle, moving object or stationary object. The vehicle speed is adaptively controlled based on the sensed speed and/or distance inputs of the proximate target as received from the radar unit 16. Alternatively, the adaptive speed control system 14 may only include sensors which detect targets forward of the driven vehicle.

The brake control unit 12 is in communication with a secondary proximity sensing system 18. The secondary sensing system 18 receives sensed inputs from one or more sensors including side proximity sensors 20, rear proximity sensors 22, or corner proximity sensors 24. Side proximity sensors 20 sense for targets on the sides of the vehicle. Rear proximity sensors 22 sense for targets rearward of the vehicle such as when the vehicle is backing up. Corner proximity sensors 24 sense for targets located at one or more corners of the vehicle such the vehicle's blind spots.

The received sensed inputs from the adaptive speed control system 14 and the proximity sensing system 18 are provided to the braking control unit 12. As braking is applied such that ABS functions are activated, the adaptive ABS control system is activated. Targets in front of the vehicle, such as a second moving vehicle or stationary object, are monitored. The speed of the sensed target is compared to the speed of the driven vehicle. The closing distance between the vehicle and the sensed target is determined. Based on the distance and/or speed difference between the sensed target and the driven vehicle, a determination is made as to the braking strategy that should be applied by the braking control unit for bringing the vehicle to a stop while attempting to maintain vehicle stability.

The determination for applying a respective strategy is based on which of three conditions are present. A first condition includes the available braking distance being greater than the determined maximum braking distance. A second braking condition includes the available braking distance being less than a determined minimum braking distance. A third condition includes the available braking distance being less than the determined maximum braking distance but greater than the determined minimum braking distance.

A respective ABS braking control strategy for the first condition includes applying an ABS braking control while allowing for a substantially maximum yaw stability control. This is performed when the available braking distance between the driven vehicle and the sensed target is greater than that calculated to stop the vehicle at a maximum distance. This allows the brake control unit 12 to apply ABS braking at while maintaining primary focus on vehicle stability (e.g., yaw stability).

A respective ABS braking control strategy for the second condition includes applying ABS braking to stop the vehicle within the substantially shortest possible distance while placing less emphasis on yaw stability control. This is performed when the available braking distance between the driven vehicle and sensed target is less than the determined minimum distance required to stop the vehicle.

A respective ABS braking control strategy for the third condition includes applying ABS braking to stop the vehicle within the available stopping distance while maintaining a determined degree of vehicle stability control. The ABS braking control strategy cooperatively blends ABS braking parameters and yaw stability parameters for providing a balanced braking strategy. This is performed when the available braking distance between the driven vehicle and the sensed target is less than that maximum distance to stop the vehicle but greater than the minimum distance required to stop the vehicle. The braking control unit may include either a table of respective cooperative blending braking-stability control parameters or an algorithm for calculating respective cooperative blending braking-stability control parameters.

In a second preferred embodiment, side targets proximal to the vehicle other than those in front of the vehicle may be taken into consideration by the braking control unit in determining the braking strategy to be applied to the vehicle. Targets to the side of the vehicle, in addition to vehicles rearward of the driven vehicle may be monitored. Such targets to the side of the vehicle may affect the allowable amount of yaw that the vehicle may deviate from its intended path of trajectory. For example, if a determination is made that the available braking distance is less than the maximum braking distance as determined by the braking control unit, braking strategies may altered further if a target is sensed in close proximity to the side of the vehicle. Such a condition may require the braking system to re-strategize the current braking strategy by applying another braking strategy that provides a medium between longer braking distance and vehicle stability for allowing yaw stability control to avoid any sensed side targets. Under such conditions, the braking control strategy is calculated to stop the driven vehicle within the available stopping distance while maintaining yaw stability control so that contact is not made with targets to the side of the vehicle.

Figure 2:
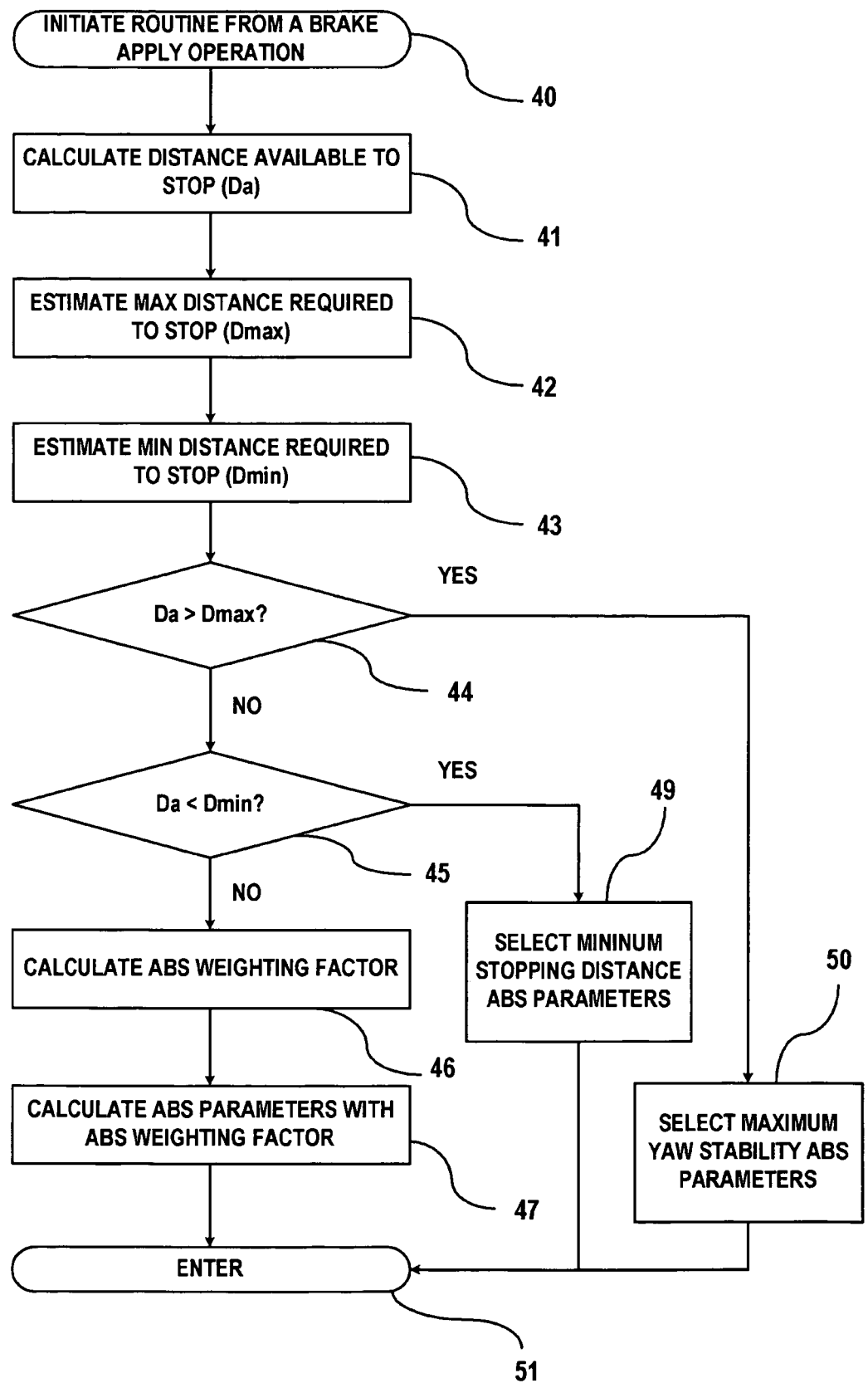
FIG. 2 is a flowchart of a method for a continuous adaptive brake control strategy according to a first preferred embodiment of the present invention.

FIG. 2 is a flowchart of a method for determining an adaptive braking strategy according to the first preferred embodiment. In step 41, an available braking distance is calculated between the driven vehicle and the sensed target forward of the vehicle in response to a brake apply by the driver of the driven vehicle that activates the ABS functions. In step 42, a determination of the required maximum distance to stop is made based on the current velocity of the driven vehicle, the velocity of the sensed target, and the distance between them. In step 43, a determination of the required minimum distance to stop is made based on the current velocity of the driven, the velocity of the sensed target, and the distance between them.

In step 44, a determination is made whether the available braking distance is greater than the determined maximum braking distance. If a determination is made that the available braking distance is greater than the determined maximum braking distance, then the braking control unit applies a braking strategy that utilizes maximum yaw stability control parameters in step 48. Under this condition, braking control is optimized for maximum vehicle stability control, since the maximum braking distance utilizing full vehicle stability control may be achieved while bringing the vehicle to a stop before contacting the forward target. After an exit event has occurred such as the vehicle stopping, or the driver releasing the brake pedal, or if ABS is no longer active, the routine is exited in step 51.

If the determination is made in step 44 that the available braking distance is less than the determined maximum braking distance, then a determination is made is step 45 of whether the available braking distance is less than the determined minimum braking distance. If the determination is made that the available braking distance is less than the determined minimum braking distance, then a braking strategy is applied for braking the vehicle in the substantially shortest distance achievable. Yaw stability control is not a primary factor under this condition. Emphasis is placed on braking the vehicle in the shortest distance possible to avoid or minimize contact with the target forward of the vehicle. After an exit event has occurred such as the vehicle stopping, or the driver releasing the brake pedal, or if ABS is no longer active, the routine is exited in step 51.

If the determination is made in step 45 that the available braking distance is greater than the calculated minimum braking distance, then a (e.g., ABS) blending factor is calculated in step 46. The blending factor is determined based on various factors including distance available to stop, the determined required distances, and the vehicle speed. In step 47, a braking strategy is determined based on the blending factor. The braking control module calculates each parameter each selected point on a braking spectrum. The braking spectrum being a continuum between the maximum yaw stability to the minimum stopping distance. After an exit event such as the vehicle stopping, or the driver releasing the brake pedal, or if ABS is no longer active, the routine is exited in step 51.

Figure 3:
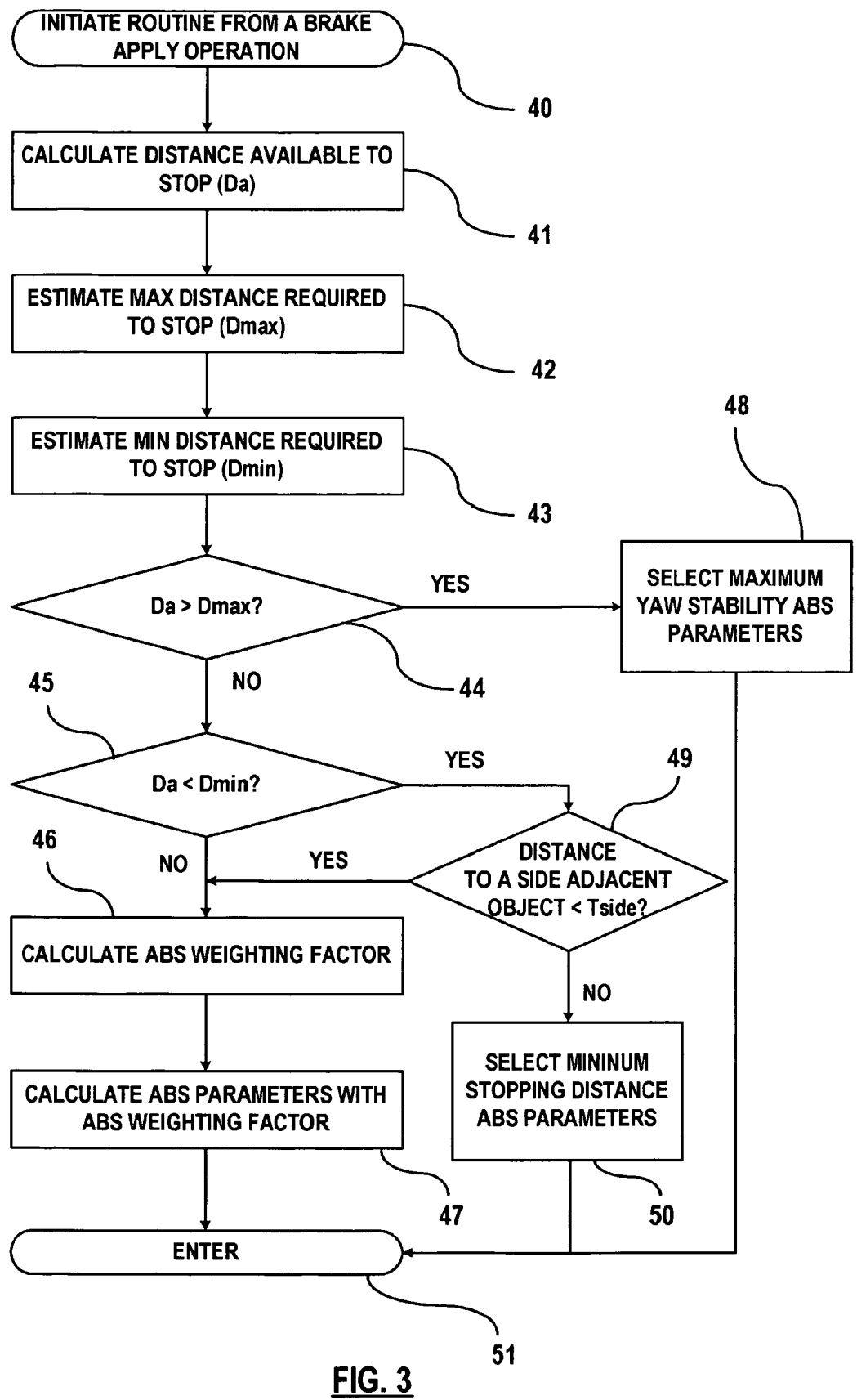
FIG. 3 is a flowchart of a method for a continuous adaptive brake control strategy according to a second preferred embodiment of the present invention.

FIG. 3 is a flowchart of a method for determining an adaptive braking strategy according to a second preferred embodiment. The method shown in FIG. 3 is similar to the method shown in FIG. 2 with the added step 49. After a determination is made in step 45 that the available stopping distance is less than the minimum stopping distance, a determination is made in step 49 of whether the distance to a side adjacent target is less that side object threshold ($T_{side}$). The $T_{side}$ is a threshold distance between the driven vehicle to a target adjacent the driven vehicle. In addition, $T_{side}$ may further be determined as a function of a rate at which the distance between the driven vehicle and the side adjacent target changes with time. The threshold distance is a predetermined or actively calculated distance that is a determining factor of whether adjacent targets should be factored in when determining the vehicle control strategy. Targets within this threshold distance should be taken into consideration when determining the maximum amount of yaw the braking control strategy may allow when braking the vehicle. The adjacent targets may be positioned to either side of the driven vehicle, a respective corner of the driven vehicle, or to the rear of the driven vehicle. Adjacent targets within $T_{side}$ and their respective distance to the driven vehicle in addition to the velocity differential between the target and the driven vehicle will be additional factors in determining a braking strategy.

In step 49, if the distance to a side adjacent target is greater than $T_{side}$, then the determined minimum stopping distance strategy is applied. A braking strategy is applied for braking the vehicle in the shortest distance achievable. Yaw stability control is not a primary factor under this condition and emphasis is placed on braking the vehicle in the shortest distance possible to avoid or minimize contact with the target forward of the vehicle. This strategy determines that the driven vehicle is at least a predetermined distance from the adjacent target such that no contact will be made with the adjacent target if primary braking control is focused on stopping the vehicle in the shortest distance achievable.

In step 49, if the distance to a side adjacent target is less than $T_{side}$, then the determined minimum stopping distance strategy will not be applied. Rather, various factors are taken into consideration to apply a cooperative blended braking strategy for applying ABS braking while maintaining a vehicle stability control strategy. The routine forwards to step 46 to determine a blending factor. The blending factor utilizes the available stopping distance, the determined minimum stopping distance, the vehicle speed, the distance to adjacent vehicles and the velocity differential between adjacent vehicles, and the required vehicle stability for taking into consideration those parameters for braking within the shortest achievable distance while maintaining a determined degree of vehicle stability.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for adaptively determining an anti-lock braking strategy for an anti-lock braking system, the method comprising the steps of:

providing an electronic braking system including anti-lock braking functionality and stability control functionality, the anti-lock braking functionality responsive to a wheel skid by preventing a locked wheel condition, the stability control functionality responsive to vehicle instability by providing vehicle stability control through vehicle braking;

sensing a wheel slip condition following a driver application of pressure to a vehicle brake pedal;

activating the anti-lock braking functionality in response to detection of a wheel slip condition following the driver application of pressure to a vehicle brake pedal to determine a first anti-lock braking strategy in response to the sensed wheel slip condition;

calculating a maximum distance to stop the vehicle;

calculating a minimum distance to stop the vehicle;

monitoring a distance differential of at least one target in proximity to a driven vehicle to determine an available distance to stop based on the distance differential;

determining a second anti-lock braking strategy by blending anti-lock braking functionality and a vehicle stability control functionality where the blending is based upon an applicable one of the following three criteria:

if the available distance to stop is greater than the calculated maximum distance to stop the vehicle, if the available distance to stop is less than calculated minimum distance to stop the vehicle, and if the available distance to stop is less than the maximum distance to stop but greater than the minimum distance to stop; and applying the second anti-lock braking strategy to enhance the stopping of the vehicle.

2. The method of claim 1 wherein the determination of the maximum distance required to stop is based on a current velocity of said driven vehicle, a velocity of said sensed target, and a distance between said driven vehicle and said target.

3. The method of claim 2 wherein the determination of the minimum distance required to stop is based on a current velocity of said driven vehicle, a velocity of said sensed target, and a distance between said driven vehicle and said target.

4. The method of claim 2 wherein the cooperative blending of the anti-lock braking functionality and the vehicle stability control functionality provides a selective compromise between an optimized vehicle stability control and an optimized stopping distance.

5. The method of claim 1 further including the steps of:

determining a side distance from a second target to said driven vehicle;

determining whether a side distance is less than a predetermined side distance threshold; and wherein the side distance from the second target is utilized to determine the second anti-lock braking strategy.

6. The method of claim 5 wherein the determination of the side distance is a function of a distance between the driven vehicle and the second target.

7. The method of claim 5 wherein the step of determining the side distance also is a further function of a rate at which said side distance between the second target and the driven vehicle changes.

8. The method of claim 4 wherein the distance differential is based on said at least one adjacent target forward of said driven vehicle.

9. The method of claim 4 wherein the distance differential is based on said at least one adjacent target rearward of said driven vehicle.

10. The method of claim 4 wherein the distance differential is based on said at least one adjacent target on a side of said driven vehicle.

11. A vehicle control system comprising:

an adaptive speed control system that monitors a speed of at least one target in relation to a driven vehicle; and a braking control system operating in an anti-lock braking control state for enhancing vehicle stability;

said braking control system being operative to determine a first anti-lock braking strategy in response to a sensed wheel slip condition and said adaptive speed control system being operative to provide speed data to said braking control system, said braking control system being further operative to determine a distance differential to the at least one target, said braking control system also operative to determine and apply a second anti-lock braking strategy in response to the distance differential by adaptively modifying said first anti-lock braking strategy by blending anti-lock braking functionality and vehicle stability control functionality as a function of the distance differential where the blending is based on an applicable one of the following three criteria:

if the available distance to stop is greater than a calculated distance to stop the vehicle at a maximum distance, if the available distance to stop is greater than a calculated distance to stop the vehicle at a minimum distance, and if the available distance to stop is less than the maximum distance to stop but greater than the minimum distance to stop; greater than a calculated distance to stop the vehicle at a minimum distance.

12. The vehicle control system of claim 11 includes a secondary proximity sensing system.

13. The vehicle control system of claim 12 wherein said secondary proximity sensing system includes at least one side proximity sensor.

14. The vehicle control system of claim 12 wherein said secondary proximity sensing system includes at least one rear proximity sensor.

15. The vehicle control system of claim 12 wherein said secondary proximity sensing system includes at least one front corner proximity sensor.

* * * * *

UNITED STATES PATENT AND TRADEMARK OFFICE
CERTIFICATE OF CORRECTION

PATENT NO. : 8,046,146 B2  Page 1 of 1
APPLICATION NO. : 11/346773
DATED : October 25, 2011
INVENTOR(S) : Douglas Charles Osborn et al.

It is certified that error appears in the above-identified patent and that said Letters Patent is hereby corrected as shown below:

Column 6, Claim 5, Line 37, change "said" to --the--.
    Column 6, Claim 7, Line 47, after "a" delete the word "further", and
                Line 48, change "said" to --the--.
    Column 6, Claim 9, Line 54, change "said" (Second Occurrence) to --the--.
    Column 6, Claim 10, Line 57, change "said" (Second Occurrence) to --the--.

Signed and Sealed this
Sixth Day of December, 2011

David J. Kappos
*Director of the United States Patent and Trademark Office*